Dec. 15, 1970　　P. T. GIBSON ET AL　　3,546,969
LOCKING DIFFERENTIAL

Filed Feb. 5, 1969　　4 Sheets-Sheet 1

INVENTORS
PHILIP TERRY GIBSON
HENRY ELWIN HULL
SHERMAN ANDREW LARIMER
BY
Olsen and Stephenson
ATTORNEYS

INVENTORS
PHILIP TERRY GIBSON
HENRY ELWIN HULL
BY SHERMAN ANDREW LARIMER

*Olsen and Stephenson*
ATTORNEYS

Dec. 15, 1970   P. T. GIBSON ET AL   3,546,969
LOCKING DIFFERENTIAL
Filed Feb. 5, 1969   4 Sheets-Sheet 3

INVENTORS
PHILIP TERRY GIBSON
HENRY ELWIN HULL
BY SHERMAN ANDREW LARIMER

Olsen and Stephenson
ATTORNEYS

INVENTORS
PHILIP TERRY GIBSON
HENRY ELWIN HULL
SHERMAN ANDREW LARIMER
BY Olsen and Stephenson
ATTORNEYS United States Patent Office 3,546,969
Patented Dec. 15, 1970

3,546,969
LOCKING DIFFERENTIAL
Philip Terry Gibson, Henry Elwin Hull, and Sherman Andrew Larimer, Columbus, Ohio, assignors to Thornton Products Company, Detroit, Mich., a corporation of Michigan
Filed Feb. 5, 1969, Ser. No. 796,764
Int. Cl. F04b *19/02;* F04c *5/00;* F16h *1/44*
U.S. Cl. 74—711                                                20 Claims

ABSTRACT OF THE DISCLOSURE

A hydraulically actuated locking differential wherein a friction disc clutch is operatively positioned between an axially movable side gear and the differential case to restrict differential action in response to fluid pressure from a pump assembly. The pump assembly is mounted within the differential spider and is actuated when the other side gear rotates relative to the spider. An auxiliary pump is mounted exterior of the differential case to supply fluid from the differential housing to the pump assembly.

BACKGROUND OF THE INVENTION

The present invention relates to a locking differential for automobiles of the type wihch are designed to overcome the problems relating to loss of traction which are inherent in connection with conventional nonlocking differentials.

A variety of different types of locking differentials have been used by automobile manufacturers, and none of them has yet proved to be wholly satisfactory for a variety of reasons. One common fault that exists with the locking differentials which have been adopted relates to the unnecessary locking that repeatedly occurs. The experience of several automotive manufacturers has been that unnecessary locking leads to overheating the differential, causes accelerated wear of the component parts, shortens the effective life of the device, creates excessive wear of the tires of the vehicle, and produces annoying chattering during turns in city driving.

The present invention is an improvement over hydraulic differentials of the type disclosed in United States Letters Patent No. 3,109,323, granted Nov. 5, 1963, to Curt Sauer, and United States Letters Patent No. 3,138,-222, granted June 23, 1964 to A. C. Dames et al., and has been designed to overcome the above-enumerated shortcomings of the prior art, as well as to provide other advantages. Accordingly, it is among the objects of the present invention to provide an improved hydraulic locking differential wherein no locking action will take place during normal city or highway driving; which is constructed and arranged so that in the event the automobile is in a situation where one driving wheel lacks traction, a desired driving or locking torque will be applied to the opposite driving wheel; to provide a construction and arrangement wherein the locking torque will be applied smoothly and maintained as long as the slipping situation of one of the drive wheels exists; wherein a locking torque of preselected maximum magnitude is delivered to the driving wheels; wherein the locking torque will diminsh to zero soon after the slipping situation has been overcome; wherein the mechanical parts of the locking differential are of a size and number so that they can readily fit into a standard differential housing of the type employed with conventional nonlocking differentials; and wherein the differential can be constructed and sold at a relatively low price.

According to a preferred form of the present invention, a locking differential is provided comprising a differential housing, a differential case rotatably mounted in the housing and containing differential gearing including two side gears adapted to be drivingly connected to two separate axle shafts and a differential pinion meshed with the side gears and mounted for turning with the differential case. A clutch mechanism is operatively positioned between the case and one of the side gears, said one gear being axially movable to effect engagement of the clutch mechanism to restrict turning of said gear relative to said case. A spider is mounted in the case coaxial of the side gears for turning with the case and the pinion gear is mounted on said spider. The spider member has an axial bore in which a pump assembly is mounted. Means are provided for supply fluid to the inlet side of the pump assembly, and other means are provided defining a pressure chamber in communication with the discharge side of the pump assembly, the last-named means including a piston or plug member forming one wall of the chamber and which is movable axially of said spider in response to fluid under pressure in said chamber, said plug member being adjacent or connected to said one side gear for moving said one side gear axially to effect engagement of the clutch mechanism. The pump assembly also has elements coupled to the other side gear and to the spider and responsive to relative rotation between the spider and the other side gear for pumping fluid under pressure to the pressure chamber. By virtue of the described components a pump assembly and associated plug member are provided which will actuate the clutch mechanism in a manner to assure transmitting necessary torque without overloading components of the pump assembly or the clutch mechanism.

For the purpose of applying the locking torque smoothly to the clutch mechanism an accumulator is positioned within the spider and is in communication with the pressure chamber. An accumulator piston moves in its bore and presses against an accumulator spring as the fluid pressure rises in the presure chamber during pressure stroke of the pump. Between pressure strokes of the pump, the accumulator maintains the system pressure, and therefore, the locking torque of the differential. This arrangement assures the smooth operation of the differential and eliminates undesirable chatter.

The spider also contains a relief valve to limit the operating pressure to a safe value. This relief valve assures that components of the differential are not placed under excessive pressures which otherwise might result in damage to such parts.

Still another feature of the present invention is the auxiliary pump which is located within the differential housing and externally of the differential case. A gravity feed device of the type shown in the aforesaid Pat. No. 3,138,222 is employed to deliver fluid from the differential housing to the auxiliary pump, the latter being operative to deliver fluid under pressure to the pump assembly within the case, as a result of rotation of the differential case relative to the differential housing.

Still another feature of the present invention is the arrangement whereby the pump assembly within the spider delivers fluid under pressure to the pressure chamber, and the latter has measured leakage therefrom so that as soon as the differential action between the two side gears has subsided, the fluid can leak from the pressure chamber so as to dissipate rapidly the fluid pressure therein when the slipping of a drive wheel has stopped, thereby assuring proper releasing action of the locking differential.

Other objects of this invention will appear in the following description and appended claims, reference being had to the accompanying drawings forming a part

DESCRIPTION OF THE PREFERRED EMBODIMENT

Figure 1:
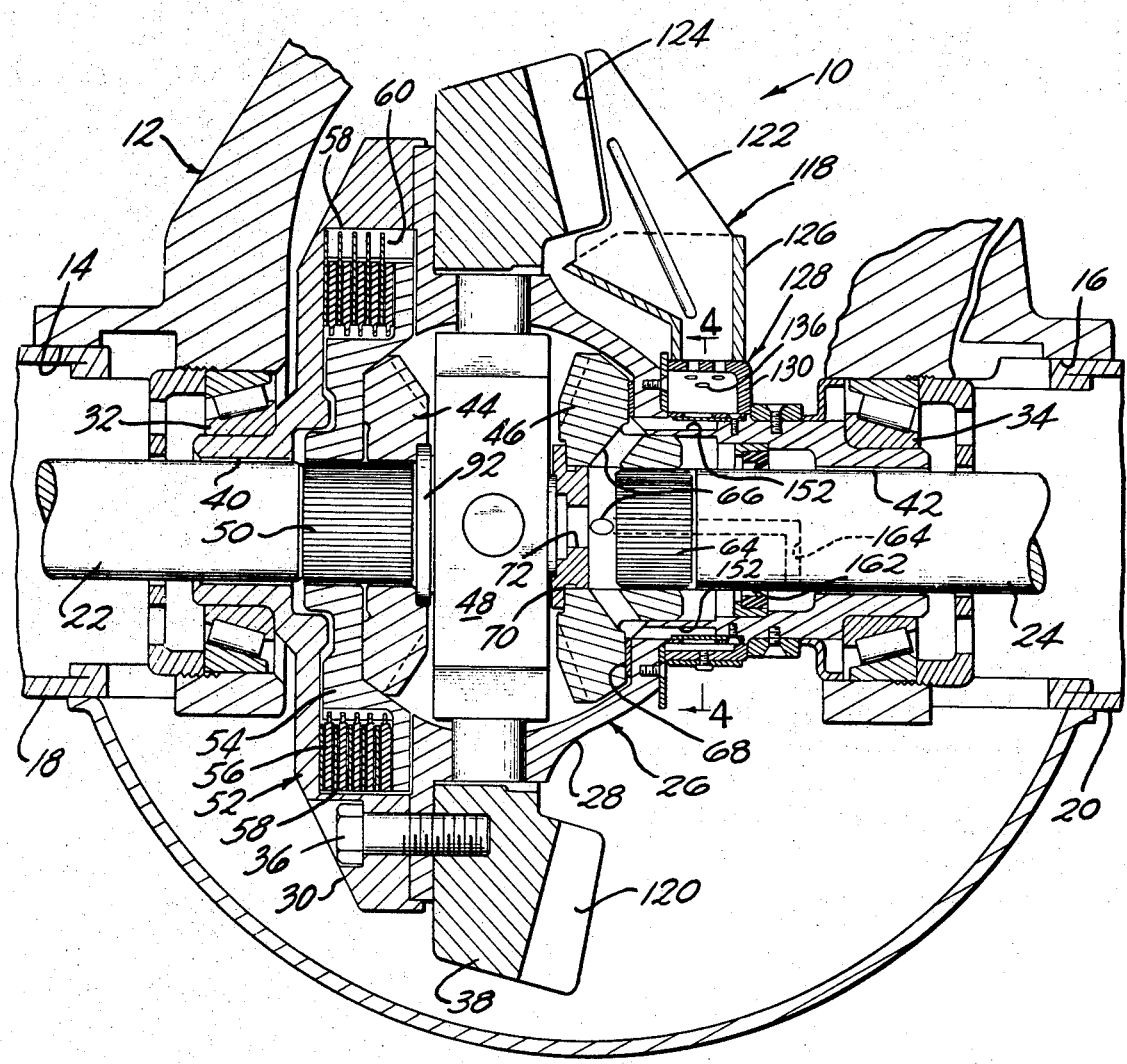
FIG. 1 is a sectional view of a differential embodying one form of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The locking differential 10 includes a differential housing 12 which is provided with oppositely positioned axially aligned openings 14 and 16 in which are secured the axle housings 18 and 20. Wheel drive shafts 22 and 24 are coaxially disposed and extend from the axle housings 18 and 20 into the interior of the differential housing 12. A differential case 26, formed in two sections 28 and 30, is suitably journaled in the differential housing 12 by the bearings 32 and 34 so that the differential case 26 can revolve relative to the differential housing 12 about the axis of the axle shafts 22 and 24. The two sections 28 and 30 of the differential case 26 are secured together by a plurality of bolts, one of which is shown at 36, such bolts also securing the ring gear 38 in coaxial relation to the outer side of the differential case 26 and in mesh with a drive pinion (not shown) which is mounted on a vehicle drive shaft (not shown). Thus, rotation of the drive pinion (not shown) will effect rotation of the differential case 26 about the axis of the wheel axle shafts 22 and 24 in the conventional manner.

The differential case 26 has openings 40 and 42 on opposite sides thereof in alignment with the openings 14 and 16 of the differential housing 12, and the shafts 22 and 24 extend through such openings 40 and 42 into the interior of the differential case 26, wherein the side gears 44 and 46 are splined thereon. Also positioned within the differential case 26 are pinions gears (not shown) which are in mesh with the side gears 44 and 46. The pinion gears (not shown) are mounted on the spider 48 so that the gearing arrangement provides conventional differential action between axle shafts 22 and 24.

The side gear 44 is mounted on the axle shaft 22 by the conventional splines 50 so that the side gear 44 will rotate with the shaft 22 and is free to move axially thereon. Operatively positioned between the side gear 44 and the case 26 is a clutch mechanism 52. The latter includes the pressure plate 54 which is splined on the shaft 22 for axial movement and for co-rotation with the side gear 44. A plurality of conventional clutch discs 56 are splined to the outer periphery of the pressure plate 44 for rotation therewith, and disposed between the clutch discs 56 are a plurality of floating plates 58 which are keyed by means of the lobes 60 to the clutch housing defined within the casing 26. Thus, if the side gear 44 is moved axially to the left, as viewed in FIG. 1, it will exert pressure against the pressure plate 54, which in turn will exert pressure against the clutch discs 56 and the floating plates 58 to effect clutching action between the side gear 44 and the case 26.

Mounted so as to close the open end of the side gear 44 is a piston member or plug 92 which is responsive to fluid pressure for moving the side gear 44 axially for effecting the clutching action between the side gear 44 and the case 26. This fluid pressure is delivered by a pump assembly 63, located within the spider 48 in a manner to be described hereinafter.

Figure 2:
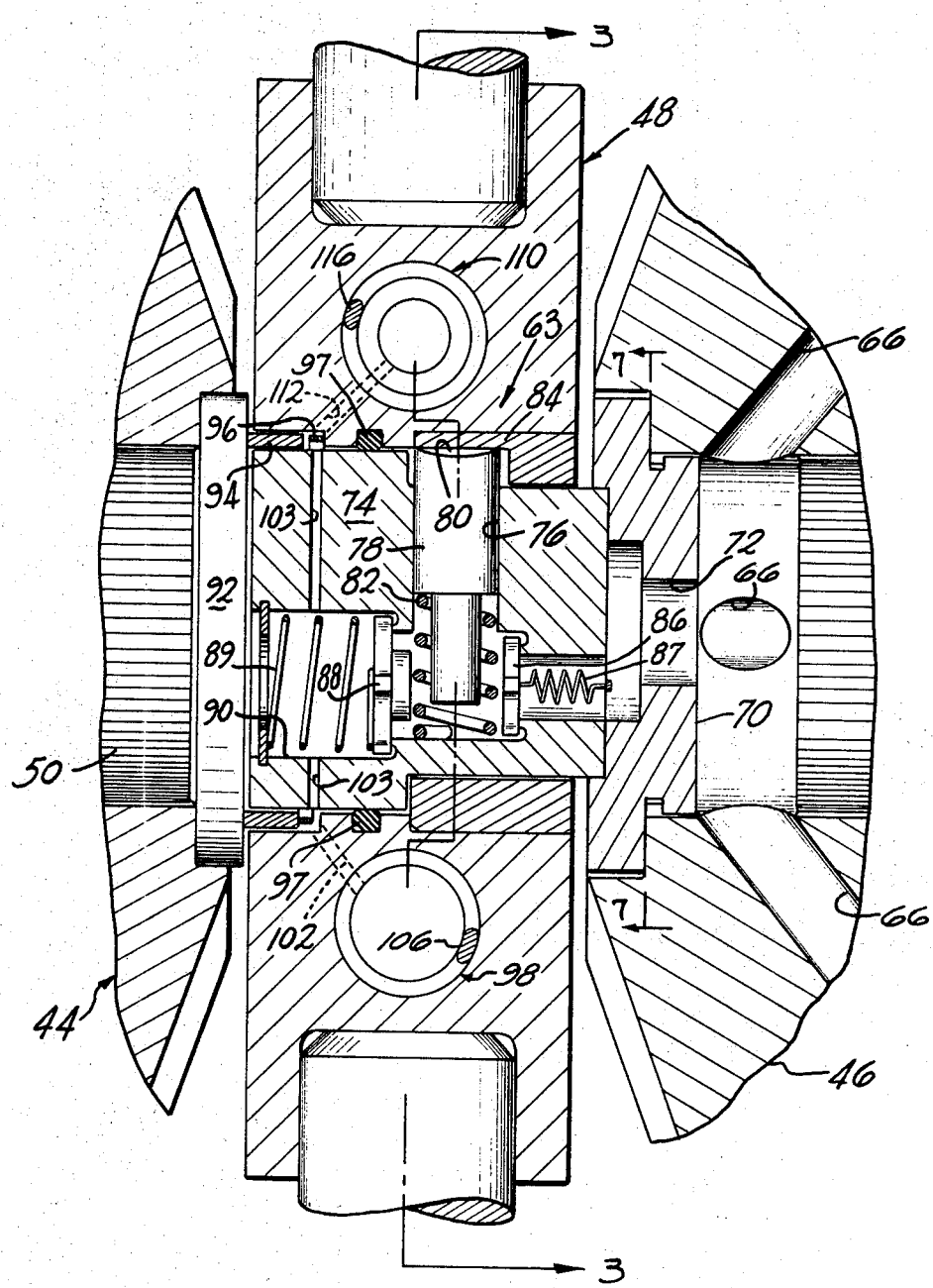
FIG. 2 is an enlarged section of the differential taken through the pump assembly which extends axially through the differential spider.

As previously indicated, the other side gear 46 is mounted on the axle shaft 24 by means of the splines 64 so that the side gear 46 will rotate with the axle shaft 24. The side gear 46 is provided with a plurality of passageways 66 for use in supplying hydraulic fluid to the inlet side of the pump assembly 63. The one face of the side gear 46 normally seats against the thrust washer 68 and the other face of the side gear 46 has seated against it the pump drive member 70. The latter is splined to the inner periphery of the side gear 46 for co-rotation therewith and has pins 71 projecting therefrom into the pump assembly 63 for driving the latter under certain prescribed conditions. It also has an axial port 72 through which hydraulic fluid can flow to the pump assembly 63, as will now be described, with particular reference to FIG. 2.

The pump assembly 63 includes a pump rotor 74 which is journaled in the spider 48, coaxially thereof, for rotation relative thereto. The rotor 74 is pinned to the pump drive member 70 by the pins 71 so that the pump rotor 74 will always rotate with the side gear 46. The pump rotor 74 has a radial bore 76 in which is mounted for reciprocation a pump piston 78 having a cam follower 80 defining its outer end. A coil spring 82 is seated against the opposite end of the piston 78 for urging the cam follower 80 radially outwardly of rotor 74. An annular cam 84 is mounted in the bore of the spider 48 and provides a surface on which the cam follower 80 can travel when relative rotation occurs between the rotor 74 and the spider 48. The cam surface is shaped so that the piston 78 will reciprocate in response to the relative turning between the rotor 74 and the spider 48. Such reciprocation will cause an intake charge of hyrdraulic fluid to enter through the check valve 86 at the inlet end of the pump rotor 74, and this fluid is then forced under pressure through a second check valve 88 into the pressure chamber 90 between the pump rotor 74 and the plug or actuating piston 92. This supplies the force to the actuating piston or plug 92, side gear 44 and pressure plate 54 to produce locking in the clutch assembly 52. Springs 87 and 89 urge check valves 86 and 88 respectively into the closed position.

It will be noted that a face seal ring 94 is provided around the outer periphery of the rotor 74 seated against the plug 92. Such seal ring is urged into engagement with the plug 92 by means of the spring 96. It will be noted that clearance is provided between the sealing ring 94 and the body of the spider 48 so that a controlled amount of leakage from the pressure chamber 90 can occur. The flow path of this leakage is from pressure chamber 90, through ports 103, into the annular space provided for spring 96 and out through the clearance provided between the sealing ring 94 and the body of the spider 48. This leakage prevents pressure buildup in the pressure chamber 90 during relatively slow turning of the pump rotor 74 with respect to the spider 48 so that during normal city driving locking action of the differential will not occur. The construction providing the leakage also functions to cause locking torque to diminish to zero rapidly after a slipping situation of one wheel relative to the other is overcome. A seal between the controlled leakage end of the pump assembly and the pumping end thereof is provided by the seal 97.

Figure 3:
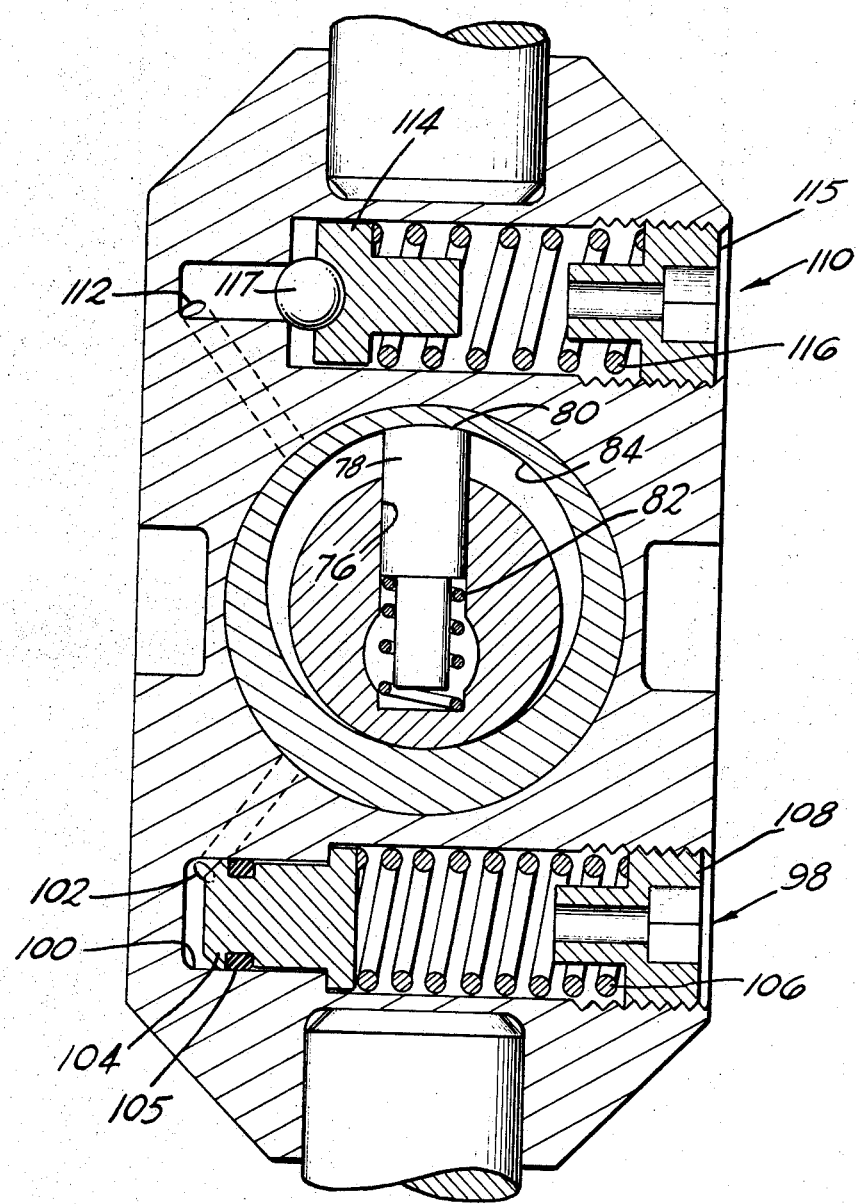
FIG. 3 is a transverse section taken on the lines 3—3 of FIG. 2.
Figure 4:
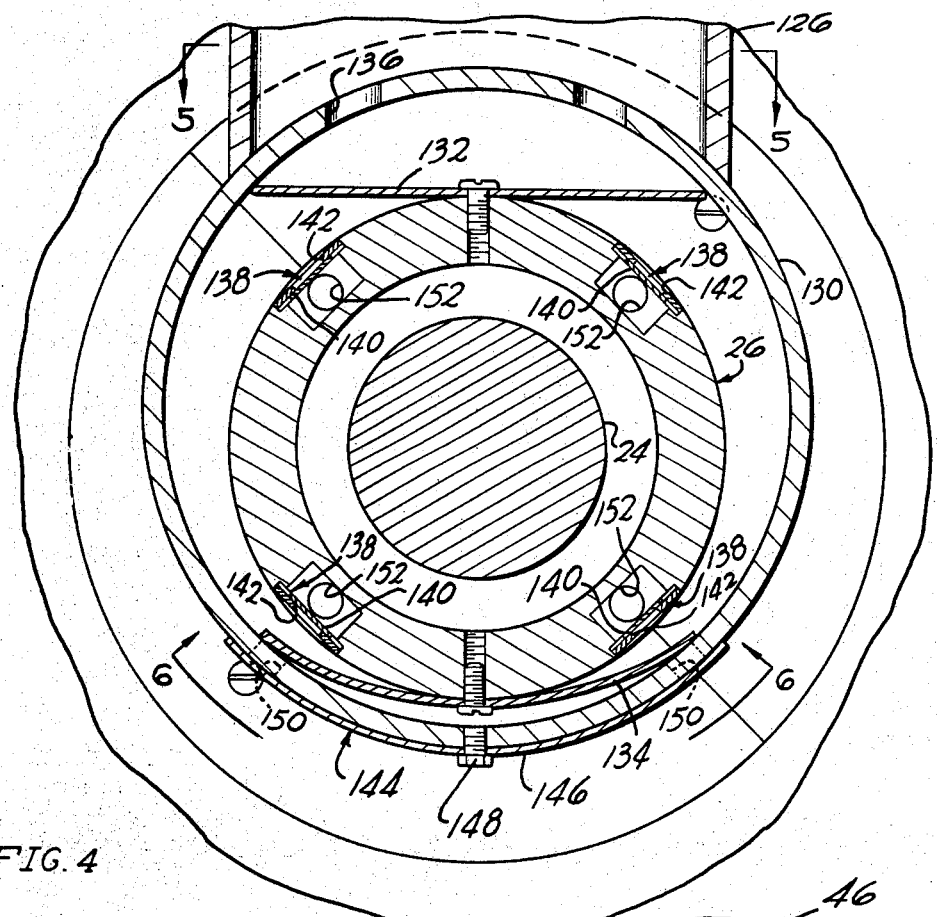
FIG. 4 is a transverse section taken on the lines 4—4, showing the auxiliary pump employed as a part of the present invention.
Figure 5:
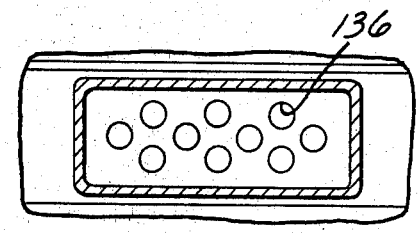
FIG. 5 is a section taken on the lines 5—5 of FIG. 4.
Figure 6:
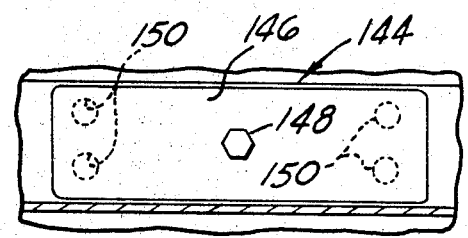
FIG. 6 is a section taken on the lines 6—6 of FIG. 4.
Figure 7:
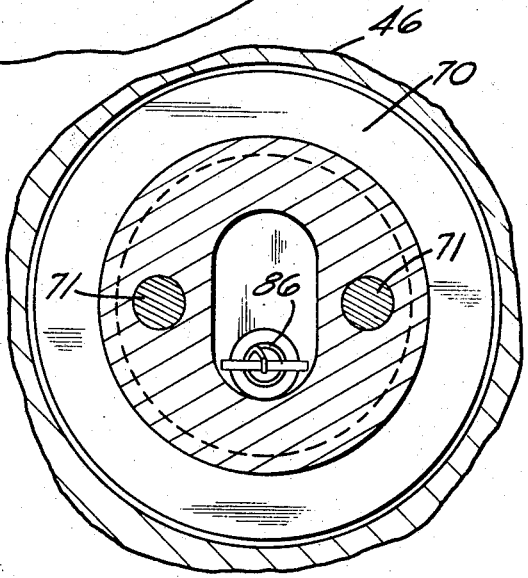
FIG. 7 is a fragmentary section taken on the lines 7—7 of FIG. 2.

In order to stabilize the fluid pressure generated by the pump assembly and to smooth out the action of the pump, control means in the form of an accumulator 98 is provided for storage of high pressure fluid. As can be seen best in FIGS. 2 and 3, the accumulator 98 comprises a cylinder or chamber 100 which is in communication through port 102 with the pressure chamber 90 at a location between the spider 48 and the outer circumference of the rotor 74 where hydraulic fluid from pressure chamber 90 can flow by way of a plurality of ports 103. An accumulator piston 104 with seal 105 is mounted in the chamber 100 for movement against the compression spring 106, and the accumulator piston 104 will move in its bore and compress the accumulator spring as the fluid pressure rises during pressure strokes of the pump. Thus, as the pump is actuated, hydraulic fluid enters the port 102 and chamber 100 under increasing pressure. Between the pressure strokes of the pump, the accumulator 98 maintains the system pressure, and therefore, the locking torque of the differential.

It will be noted that a screw 108 is provided for manually setting the spring pressure of compression spring 106 for regulation of the operation of the accumulator 98.

To limit the operating pressure to a safe value, the relief valve 110 is provided. As seen best in FIGS. 2 and 3, the relief valve is in communication with the pressure chamber 90 in rotor 74 by means of the oil ports 112 and 103. The relief valve which includes the bolt 114 is adjusted by means of the screw 115 during assembly to provide the desired preload on the relief valve spring 116 and ball 117. Under these conditions, during operation, the system pressure will rise only to the point where the force of hydraulic fluid on the ball 117 equals that of the spring preload. Higher pressures are prevented as the ball 117 will move to allow the excess fluid to escape.

Referring now to FIGS. 1 and 4-7, inclusive, a prefered arrangement for supplying hydraulic fluid from the differential housing 12 to the interior of the case 26 will be described. For this purpose a gravity feed unit 118 is provided. Normally, the housing 12 is partially filled with a suitable lubricating fluid which during travel of the vehicle equipped with the locking differential 10 is splashed around the interior of the housing 12 and adheres to and travels with the movable parts of the housing 12. Substantial quantities of this lubricating fluid travel with the rotating ring gear 38 and particularly the toothed portions 120 thereof.

The feed unit 118 functions to deliver some of this lubricant in the housing 12 to the interior of the gear case 26. The unit 118 includes an interceptor plate 122, of irregular shape, which is mounted in a vertical position in close proximity to the toothed portion 120 of the ring gear 38. The fluid on the plate 122 travels under the force of gravity downwardly into a funnel or lubrication collector member 126. The latter is suitably supported in a stationary manner within the differential housing 12, as can be seen, for example, in United States Letters Patent No. 3,138,222.

The hydraulic fluid collected in the funnel member 126 discharges through ports 136 into an auxiliary pump 128 which has a stationary housing 130 connected to the funnel member 126. The stationary housing 130 is circular in shape and has its center eccentrically disposed with respect to the common axis of the differential case 26 and the axle shafts 22 and 24. This eccentric relationship can be seen best in FIGS. 1 and 4.

Rigidly connected to the differential case 26 are a pair of flexible plate supply vanes 132 and 134. These vanes are of a dimension so that when one is positioned at the upper portion of the auxiliary pump as shown by vane 132 in FIG. 4, it will be in a nearly horizontal or flat position, and when the case has been revolved 180°, the vane will be bowed to the position of the illustrated vane 134. Thus, rotation of the case 26 relative to the stationary housing 130 will result in oscillating movements of the vanes 132 and 134 providing a pumping action so that hydraulic fluid which has passed into the housing 130 via ports 136 will be urged inwardly through the plurality of check valves 138 around the periphery of the case 26. The check valves 138 are preferably formed of a conventional reed valve construction wherein the inner reed 140 is deflected inwardly by the oil pressure to permit flow of oil inwardly through the port 142, and when the oil pressure subsides such reed will return to the closed position shown in FIG. 4 to prevent return flow through such port 142.

The auxiliary pump 128 is also provided with a pressure relief valve 144, mounted on the exterior of the stationary housing 130. The relief valve 144 comprises a flexible bowed strip 146 which is secured to the housing 130 by the screw 148. In normal operation the member 146 will close the ports 150, but if the pressure within the housing 130 exceeds a preselected amount, the pressure will cause the flexible plate 146 to bow outwardly, thereby relieving the internal pressure within the housing 130.

The auxiliary pump 128 will therefor discharge fluid which it receives from the funnel member 126 into the axially disposed passageways 152 in the case 26, from which the lubricating fluid can be discharged into the case adjacent to the passageways 66, see FIG. 1, in the one side gear 46 from which the fluid can flow through the pump drive member 70 into the inlet end of the pump assembly 63. Thus, a constant supply of oil is always available for effecting the locking action of the differential when slipping of one of the driven wheels occurs.

A bleed port 164 is provided in axle shaft 24 as an escape path for air which may accumulate between the end of axle shaft 24 and the pump drive member 70 if the hydraulic fluid drains away during periods when the vehicle is not in operation. When the vehicle with the locking differential 10 is again operated, the auxiliary pump 128 supplies hydraulic fluid to the space between axle shaft 24 and the pump drive member 70 as discussed above. Due to centrifugal force this fluid fills the available space radially toward the axis of rotation. As the space is filled with fluid the displaced air exits through port 164.

A seal 162 is provided between the differential case 26 and axle shaft 24 to prevent the escape of hydraulic fluid which may leak past splines 64.

Thus, in normal operation, a source of fluid is always present at the inlet end of the pump assembly 63. During normal city driving if any rotation of the case 26 relative to the side gear 46 occurs, such as for example when cornering, or the like, the pump piston 78 will be reciprocated at a relatively slow rate producing limited pumping action. However, by virtue of the permitted leakage from the pressure chamber 90 and the stabilizing effect of the accumulator 98, insufficient force will be exerted against the pressure plate 54 to actuate the clutch mechanism 52. Should undesirable slippage of one wheel occur, the pumping action will be at a greater rate causing actuating of the clutch mechanism 52 to produce the desired locking action. Such locking action will be released quickly and smoothly as soon as such slippage ceases by virtue of the controlled leakage permitted from the pressure chamber 90.

The present invention also assures that excessive pressures between components of the pump assembly and clutch mechanism are avoided so that desirable longevity of the differential is assured.

What is claimed is:

1. A locking differential comprising a differential housing, a differential case rotatably mounted in the housing and containing differential gearing including two side gears adapted to be drivingly connected to separate axle shafts and a differential pinion meshed with the side gears and mounted for turning with the differential case, a clutch mechanism operatively positioned between said case and one of said side gears, said one gear being axially movable to effect engagement of said clutch to restrict turning of said gear relative to said case, a spider mounted in said case coaxial of said side gears for turning with said case and on which spider said pinion gear is mounted, said spider having an axial bore in which a pump assembly is mounted, means for supplying fluid to the inlet side of said pump assembly, means defining a pressure chamber in communication with the discharge side of said pump assembly, the last-named means including a plug forming one wall of the chamber movable axially of said spider in response to fluid under pressure in said chamber, said plug being associated with said one side gear for moving said one side gear axially to effect engagement of said clutch, said pump assembly having elements coupled to said other side gear and to said spider and responsive to relative rotation between said spider and said other side gear for pumping fluid under pressure to said pressure chamber.

2. A locking differential as defined by claim 1, wherein the pump elements of said pump assembly comprising a pump rotor journaled in said spider for rotation relative thereto, and a piston radially disposed in said pump rotor and having one end crowned to act as a cam follower, said spider having an annular cam surface on which said follower is adapted to travel to provide pumping action of said piston when relative rotation occurs between said pump rotor and said spider, said pump rotor being connected to said other side gear for corotation therewith.

3. A locking differential as defined by claim 2, wherein said pump rotor is connected to said other side gear by an annular pump drive member which is splined to said other side gear and pinned to said pump rotor.

4. A locking differential as defined by claim 1, wherein said means for supplying fluid to the inlet side of said pump assembly includes an auxiliary pump supported within said differential housing for pumping lubricating fluid from said differential housing into said case.

5. A locking differential as defined by claim 4, wherein said auxiliary pump includes a stationary housing enclosing one end of said case in eccentric relationship and having fluid inlet means, said case having means providing communication between the interior of said stationary housing and the inlet to said pump assembly, at least two flexible supply vanes mounted on said case and in engagement with the internal circumferential wall of said stationary housing responsive to rotation of the case to displace fluid from within said stationary housing to the inlet of said pump assembly.

6. A locking differential as defined by claim 5, wherein the communication means in said case includes check valve means to permit flow of said fluid only in a direction from said stationary housing to said pump assembly.

7. A locking differential as defined by claim 5, wherein said auxiliary pump includes gravity feed means for feeding fluid from said differential housing to the fluid inlet means of said stationary housing.

8. A locking differential as defined by claim 1, wherein an accumulator assembly is provided in communication with said pressure chamber for controlling the fluid pressure within such chamber in such a way as to smooth out the torque transmitted through said clutch mechanism.

9. A locking differential as defined by claim 8, wherein said accumulator assembly comprises a cylinder having one end in communication with said pressure chamber, a piston seated in said cylinder adjacent to said one end, spring means urging said piston in a direction toward said pressure chamber into its seated position, and means for selectively establishing the magnitude of preloading of said spring means.

10. A locking differential as defined by claim 1, wherein a relief valve assembly is provided in communication with said pressure chamber to limit the pressure in such chamber.

11. A locking differential comprising a housing, a differential case rotatably mounted in said housing and containing differential gearing including two side gears adapted to be drivingly connected to separate axle shafts and a differential pinion meshed with the side gears and mounted for turning with the differential case, a clutch mechanism operatively positioned between said case and one of said side gears, said one gear being axially movable to effect engagement of said clutch to restrict turning of said gear relative to said case, a spider mounted in said case for turning with said case and on which said pinion gear is mounted, a pump assembly mounted in said spider including a plug responsive to fluid pressure generated by the pump assembly to move said one side gear for actuating said clutch mechanism, said pump assembly being coupled to said other side gear and responsive to relative rotation between said spider and said other side gear for generating said fluid pressure, and control means associated with said pump assembly for stabilizing the fluid pressure generated by said pump assembly.

12. A blocking differential as defined by claim 11, wherein said control means is manually adjustable for regulating the influence of said control means on the operating pressures generated by said pump assembly.

13. A locking differential as defined by claim 11, wherein second control means are associated with said pump assembly for limiting the maximum effective pressure generated by said pump assembly.

14. A locking differential as defined by claim 13, wherein said second control means is manually adjustable for selecting the maximum effective pressure.

15. A locking differential comprising a housing, a differential case rotatably mounted in said housing and containing differential gearing including two side gears adapted to be drivingly connected to separate axle shafts and a differential pinion meshed with the side gears and mounted for turning with the differential case, a clutch mechanism operatively positioned between said case and one of said side gears, said one gear being axially movable to effect engagement of said clutch to restrict turning of said gear relative to said case, a spider mounted in said case for turning with said case and on which said pinion gear is mounted, a pump assembly mounted in said spider including a plug responsive to fluid pressure generated by the pump assembly to move said one side gear for actuating said clutch mechanism, said pump assembly being coupled to said other side gear and responsive to relative rotation between said spider and said other side gear for generating said fluid pressure, and an auxiliary pump supported within said differential housing for pumping lubricating fluid from said differential housing into said case to the inlet of said pump assembly.

16. A locking differential as defined by claim 15, wherein said auxiliary pump includes a stationary housing enclosing one end of said case in eccentric relationship and having fluid inlet means, said case having means providing communication between the interior of said stationary housing and the inlet to said pump assembly, at least two flexible supply vanes mounted on said case and in engagement with the internal circumferential wall of said stationary housing responsive to rotation of the case to displace fluid from within said stationary housing to the inlet of said pump assembly.

17. A locking differential as defined by claim 15, wherein the communication means in said case includes check valve means to permit flow of said fluid only in a direction from said stationary housing to said pump assembly.

18. A locking differential as defined by claim 15, wherein said auxiliary pump includes gravity feed means for feeding fluid from said differential housing to the fluid inlet means of said stationary housing.

19. A locking differential as defined by claim 15, wherein a relief valve is mounted on said stationary housing to limit the maximum pressure generated by the auxiliary pump.

20. A locking differential as defined by claim 15, wherein an air bleed means is provided in the form of a bleed port in one axle shaft to allow passage of displaced air as fluid is supplied to said pump assembly by said auxiliary pump.

References Cited

UNITED STATES PATENTS

| | | | |
|---|---|---|---|
| 2,949,792 | 8/1960 | Smith | 74—711 |
| 3,109,323 | 11/1963 | Saurer | 74—711 |
| 3,158,042 | 11/1964 | Saurer | 74—711 |
| 3,361,008 | 1/1968 | Fallon | 74—711 |
| 3,393,582 | 7/1968 | Mueller | 74—711 |

DONLEY J. STOCKING Primary Examiner

T. C. PERRY, Assistant Examiner

U.S. Cl. X.R.

103—117, 160